UNITED STATES PATENT OFFICE.

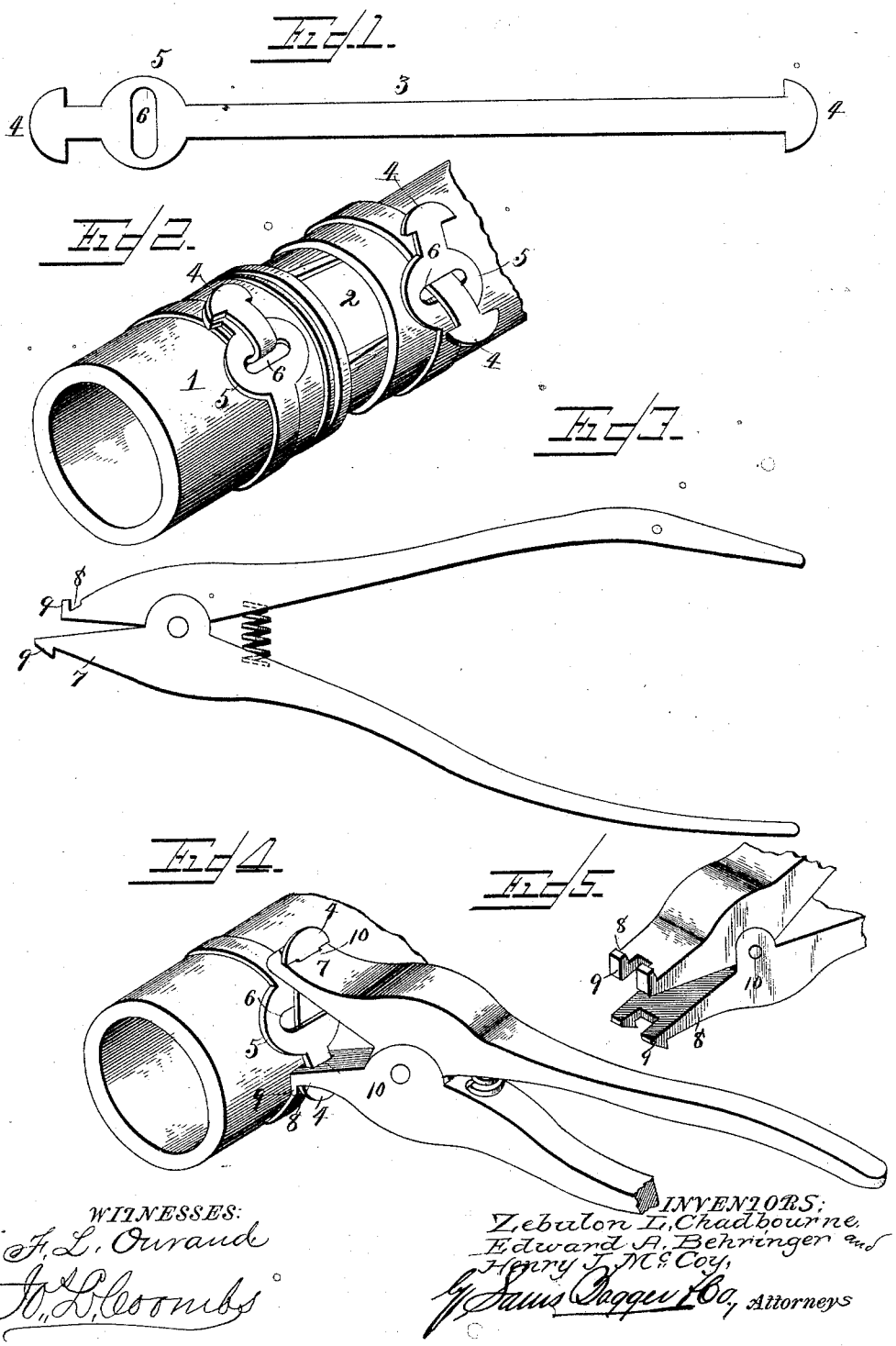

ZEBULON L. CHADBOURNE AND EDWARD A. BEHRINGER, OF BROOKLYN, NEW YORK, AND HENRY J. McCOY, OF ORANGE, NEW JERSEY.

DEVICE FOR SECURING HOSE TO COUPLINGS.

SPECIFICATION forming part of Letters Patent No. 477,043, dated June 14, 1892.

Application filed February 2, 1892. Serial No. 420,121. (No model.)

*To all whom it may concern:*

Be it known that we, ZEBULON L. CHADBOURNE and EDWARD A. BEHRINGER, of Brooklyn, in the county of Kings and State of New York, and HENRY J. McCOY, of Orange, in the county of Essex, New Jersey, have invented certain new and useful Improvements in Devices for Securing Hose to Couplings; and we do hereby declare that the following is a full, clear, and exact description of the invention, which will enable others skilled in the art to which it appertains to make and use the same, reference being had to the accompanying drawings, which form a part of this specification.

Our invention relates to improvements in means for securing rubber, leather, canvas, and other hose to metallic couplings.

The object of the invention is to provide a simple and inexpensive device whereby hose may be attached to couplings in a very rapid and efficient manner without liability of the couplings becoming detached and a perfectly water-tight joint secured.

The invention consists, essentially, in a peculiarly-shaped metallic band with shouldered heads adapted to be tightly drawn around the hose where the coupling is inserted and one of the heads passed through a slot in the band and bent upon the other heads, as hereinafter fully described and claimed.

In the accompanying drawings, Figure 1 is a view of a metal strip comprising the fastening-band. Fig. 2 is a view showing the band passed around a piece of hose and one of the ends bent down upon the other to secure the band. This figure also shows the band in position before the end is bent. Fig. 3 is a side view of a pair of pliers used in tightening the band. Fig. 4 is a perspective view showing the pliers engaged with the heads of the band in the act of tightening the band.

In the said drawings, the reference-numeral 1 designates a section of ordinary rubber garden-hose, and 2 the hollow metallic coupling which is inserted in the end of the hose, as usual.

The numeral 3 denotes the securing-band, consisting of a strip of metal sufficiently flexible to be readily bent around the hose, so as to conform to the contour thereof. Each end of this strip is formed with a shouldered head 4 and near one end is provided with an enlarged portion 5, having an elongated slot 6 of sufficient size to permit the head at the other end to pass through.

In applying the band to the hose we employ a pair of peculiarly-formed pliers. (Shown in Figs. 3 and 4.) These pliers are formed with a long arm 7 and a short arm 8 and at their ends are provided with outwardly-projecting lugs 9, with an intermediate slot or recess 10.

The operation will be readily understood. The band is bent around the hose and one of the headed ends passed through the slot or aperture 6, as seen in Fig. 2. The lugs on the arms of the pliers are then engaged with the shoulders on the heads 4, and by bringing the other ends of the arms together the band is tightly clamped around the hose. By now using the pliers as a lever, with the short arm 8 as a fulcrum, the end of the band passed through the slot can be bent down upon the other head, so as to securely clamp the band and prevent loosening of the same.

From the above it will be seen that the hose is securely clamped to the coupling, so that there will be no liability of the latter becoming detached or of water working through the joint.

The invention can be employed in connection with all kinds and descriptions of hose and couplings and is very useful and valuable, owing to its simplicity and the ease and rapidity by which the fastening-band can be applied.

We make no claim herein to the pliers above described, as they form the subject of a concurrent application, Serial No. 420,122.

Having thus described our invention, what we claim is—

1. The herein-described device for clamping hose and the like to couplings, consisting of a metallic strip or band having a shouldered head at each end and an aperture or slot for the passage of one of said heads, substantially as set forth.

2. The combination, with a flexible hose and a hollow metallic coupling, of the metallic fastening-band having headed ends and an aperture near one end, said band being passed around the hose, and one of the headed ends passed through said slot and bent upon the other end, substantially as described.

In testimony that we claim the foregoing as our own we have hereunto affixed our signatures in presence of two witnesses.

ZEBULON L. CHADBOURNE.
EDWARD A. BEHRINGER.
HENRY J. McCOY.

Witnesses:
JOHN HOYER,
FLEUR B. LOVEJOY.